United States Patent
Fridolfsson et al.

(10) Patent No.: US 10,618,766 B2
(45) Date of Patent: Apr. 14, 2020

(54) GRIPPING DEVICE, LOADING STATION AND A METHOD FOR GRIPPING A STACK

(71) Applicant: Norden Machinery AB, Kalmar (SE)

(72) Inventors: Paer Fridolfsson, Kalmar (SE); Peter Johnsson, Ljungbyholm (SE)

(73) Assignee: Norden Machinery AB, Kalmar (SE)

( * ) Notice: Subject to any disclaimer, the term of this patent is extended or adjusted under 35 U.S.C. 154(b) by 0 days.

(21) Appl. No.: 16/315,197

(22) PCT Filed: Jul. 7, 2017

(86) PCT No.: PCT/SE2017/050766
§ 371 (c)(1),
(2) Date: Jan. 4, 2019

(87) PCT Pub. No.: WO2018/009140
PCT Pub. Date: Jan. 11, 2018

(65) Prior Publication Data
US 2019/0152734 A1    May 23, 2019

(30) Foreign Application Priority Data

Jul. 8, 2016    (SE) ...................................... 1651017

(51) Int. Cl.
*B65H 31/30* (2006.01)
*B65H 1/30* (2006.01)
(Continued)

(52) U.S. Cl.
CPC ...... *B65H 31/3045* (2013.01); *B25J 15/0253* (2013.01); *B31B 50/022* (2017.08); *B31B 50/06* (2017.08); *B65H 1/00* (2013.01); *B65H 1/30* (2013.01); *B65H 5/006* (2013.01); *B65H 5/14* (2013.01); *B65H 31/3036* (2013.01); *B65H 2555/31* (2013.01); *B65H 2701/1766* (2013.01)

(58) Field of Classification Search
CPC ........ B65H 31/3045; B65H 1/00; B65H 1/30; B65H 5/006; B65H 5/14; B65H 31/3036;
(Continued)

(56) References Cited

U.S. PATENT DOCUMENTS 4,588,180 A * 5/1986 Ballestrazzi ............. B65H 1/24
271/150
6,082,797 A * 7/2000 Antonette ................ B25J 9/104
294/103.1
(Continued)

FOREIGN PATENT DOCUMENTS

CH          703288 B1    2/2015
DE         4208450 A1    9/1993
(Continued)

OTHER PUBLICATIONS

International Searching Authority, International Search Report and Written Opinion for International Application No. PCT/SE2017/050766, dated Oct. 11, 2017, 10 pages, Swedish Patent and Registration Office, Sweden.

*Primary Examiner* — Dean J Kramer
(74) *Attorney, Agent, or Firm* — Alston & Bird LLP

(57) ABSTRACT

Gripping device adapted for gripping a stack of flat-folded cartons, where the gripping device comprises a first gripping jaw and a second gripping jaw arranged adjacent each other and enclosing a holding space, where the gripping device is provided with a first open state in which the distance between the gripping jaws is greater than the height of a flat-folded carton, and where the gripping device is provided with a second closed state in which the distance between the gripping jaws is less than the height of a flat-folded carton, and that the gripping device is adapted to displace one side of the stack of flat-folded cartons in a longitudinal direction, such that each flat-folded carton of the stack of flat-folded cartons will be held in an angled state by the gripping device. The advantage of the invention is that a stack of flat-folded cartons can be held in a secure way, where the height of the stack is reduced when the stack is held.

12 Claims, 8 Drawing Sheets

(51) Int. Cl.
  *B65H 5/14* (2006.01)
  *B25J 15/00* (2006.01)
  *B31B 50/06* (2017.01)
  *B25J 15/02* (2006.01)
  *B65H 5/00* (2006.01)
  *B31B 50/02* (2017.01)
  *B65H 1/00* (2006.01)

(58) Field of Classification Search
  CPC ........ B65H 2555/31; B65H 2701/1766; B65H 2301/422; B65H 2301/4222; B65H 2301/4223; B65H 2301/4224; B65H 2301/42242; B65H 2301/42244; B65H 2301/4227; B31B 50/06; B31B 50/022; B25J 15/0253; B25J 15/0004
  USPC .............................. 294/119.1, 197, 103.1, 2
  See application file for complete search history.

(56) References Cited

U.S. PATENT DOCUMENTS

| | | | | |
|---|---|---|---|---|
| 6,227,793 B1 * | 5/2001 | Knighten | ................ | B25J 9/041 294/119.1 |
| 7,547,052 B2 * | 6/2009 | Yohe | ..................... | B65G 47/90 294/103.1 |
| 7,967,354 B2 * | 6/2011 | Faulkner | ................ | B25J 9/0093 294/103.1 |
| 8,807,912 B2 * | 8/2014 | Liebheit | ................. | B65G 61/00 294/103.1 |
| 9,573,787 B2 * | 2/2017 | Sperl | ................... | B65H 31/3045 |
| 2003/0120387 A1 | 6/2003 | Sherwin | | |
| 2004/0240979 A1 | 12/2004 | Beavers et al. | | |
| 2005/0000193 A1 | 1/2005 | Bigoni | | |
| 2007/0147981 A1 | 6/2007 | Moncrief et al. | | |
| 2012/0099956 A1 * | 4/2012 | Diehr | ....................... | B65H 1/30 414/728 |
| 2012/0210679 A1 * | 8/2012 | Ford | ....................... | B65B 69/00 53/492 |
| 2015/0314455 A1 * | 11/2015 | Morency | .............. | B25J 15/0014 414/799 |
| 2019/0077598 A1 * | 3/2019 | Perry-Eaton | ............ | B07C 3/087 |

FOREIGN PATENT DOCUMENTS

| | | | | |
|---|---|---|---|---|
| EP | 0706967 A1 * | 4/1996 | ............... | B65G 47/90 |
| EP | 2072430 A1 * | 6/2009 | ............. | B65G 47/90 |
| FR | 2740439 B1 | 11/1997 | | |
| WO | WO-2015147725 A1 * | 10/2015 | ......... | B65H 31/3045 |

* cited by examiner

GRIPPING DEVICE, LOADING STATION AND A METHOD FOR GRIPPING A STACK

CROSS REFERENCE TO RELATED APPLICATIONS

This application is a National State Application, filed under 35 U.S.C. § 371, of International Application No. PCT/SE2017/050766, filed Jul. 7, 2017, which claims priority to Swedish Application No. 1651017-4, filed Jul. 8, 2016, the contents of which are hereby incorporated by reference in their entirety.

BACKGROUND

Related Field

The present invention belongs to the field of the packing industry, and more specifically to the field of transferring a stack of flat-folded cartons to a magazine.

Description of Related Art

Packaging articles often involve placing them within a carton, sometimes together with other articles. These cartons often have a design on the outside allowing the consumer to be attracted to the product or receive information regarding the product by way of printing on the outside of the carton and may also protect the product. Often, machines are used at various steps in order to automate the packaging process.

Commonly, the cartons will be delivered to the packing facilities folded as flat-folded cartons to improve economy of transport and handling of the cartons. The flat-folded cartons will need to be erected before articles can be placed inside them. This may also be done by a machine in order to automate the erecting and packaging process. Sometimes, the machine will receive flat-folded cartons in a continuous feed, but they may also be received one by one. Another way to supply a carton erecting machine is by providing the erecting machine with a magazine which holds a pack of flat-folded cartons from which the erecting machine can withdraw a flat-folded carton and erect it. The erected carton is forwarded by e.g. a conveyor to a packing station where an article is placed inside the carton.

Normally, the flat-folded cartons are placed in a magazine in an erecting machine, where they are picked out of the magazine one at the time. The flat-folded cartons are often picked out from the underside of the magazine by a pick-up head, and the magazine is loaded from above. In this way, the magazine can be loaded without disturbing the pick-up head and the feeding of erected cartons. The magazine is preferably loaded with a stack of flat-folded cartons at appropriate intervals in order to provide a buffer with flat-folded cartons. A buffer is further of advantage since it will stabilize the pick-up of flat-folded cartons from the magazine. On the other side, a too large buffer may be unstable in that the flat-folded cartons may not lay flat if the stack is too high. A preferred size of a magazine may be in the order of 100-400 cartons.

DE 4208450 A1 discloses feeding a packaging machine with flat-folded boxes delivered on a carrier. Two linearly displaceable gripper arms of a gripper enter the magazine in cavities on opposing sides of the stack of boxes, and press together on the boxes. The boxes may then be lifted up and out of the carrier, as they are held together by the pressure exerted by the grippers. The stack of boxes may then be moved into a suitable position, such as being transferred to a conveyor belt.

While the solution of DE4208450A1 works well in some cases, there is still room for an improved gripping device adapted for feeding flat-folded cartons to a magazine.

BRIEF SUMMARY

An object of the invention is to provide an improved gripping device for gripping a stack of flat-folded cartons. A further object of the invention is to provide a loading station for loading a stack of flat-folded cartons into a magazine. Another object of the invention is to provide a method for gripping a stack of flat-folded cartons with a gripping device.

The solution to the problem according to the invention is described in the characterizing part of claim 1. The other claims contain advantageous embodiments and further developments of the gripping device.

In a gripping device adapted for gripping a stack of flat-folded cartons, where the gripping device comprises a first gripping jaw and a second gripping jaw arranged adjacent each other and enclosing a holding space, where a centre axis of the gripping device is parallel with a gripping surface of a gripping jaw, where the gripping device is provided with a first open state in which the distance between the gripping jaws is greater than the height of a stack of flat-folded cartons, the object of the invention is achieved in that the gripping device is adapted to displace an upper or lower side of the stack of flat-folded cartons in a longitudinal direction parallel to a centre axis of the gripping device, and that the gripping device is provided with a second closed state in which the distance between the gripping jaws is less than the height of the stack of flat-folded cartons, such that each flat-folded carton of the stack of flat-folded cartons will be held in an angled state by the gripping device.

The gripping device according to the invention will hold the stack of flat-folded cartons obliquely, such that the height of the gripped stack will be slightly lower than the height of the stack before the stack is gripped. In this way, the insertion of a stack of flat-folded cartons into a magazine is simplified. The used magazine may further have the same dimensions as a flat-folded carton, i.e. the depth of the magazine may correspond to the height of a flat-folded carton. By minimizing the play between the magazine and the stack of flat-folded cartons at the long side edges of a flat-folded carton, the stack of flat-folded cartons can be held in a secure way and will not displace very easy in the magazine. The distance between the gripping jaws in the second closed state is preferably between 2 to 15% less than the height of a flat-folded carton. For a small carton, this may correspond to a length difference of between 2-10 mm.

In one development of the invention, each gripping jaw comprises a plurality of gripping fingers. This makes the grip more stable and may allow for better access when gripping a stack of flat-folded cartons in a feeding station.

In one development of the invention, the first gripping jaw is displaced between 2 to 15% of the length of the stack in a longitudinal direction with regards to the second gripping jaw. For smaller cartons, this may correspond to a length displacement of between 2-10 mm, which allows the stack of flat-folded cartons to be reduced somewhat in height and still allows the gripping device to hold the stack of flat-folded cartons in a secure way.

In one development, the gripping device is provided with a pushing device that is adapted to push one side of the stack of flat-folded cartons in a longitudinal direction when the gripping device is closed, such that the gripping device will hold the stack of flat-folded cartons in an angled state.

In one development, the gripping device is provided with a parallelogram arrangement, which allows a gripping jaw to decrease the distance to the other gripping jaw and at the same time to displace in a longitudinal direction when the gripping device is closed, such that the gripping device will hold the stack of flat-folded cartons in an angled state.

One object of the invention is achieved by a loading station comprising an inventive gripping device.

In one development of the invention, the loading station is adapted to pick up a stack of flat-folded cartons at a feeding position, where the flat-folded cartons may be arranged in a horizontal direction, and to move the stack of flat-folded cartons to a loading position in which the stack of flat-folded cartons is inserted into a magazine, where the magazine may be inclined from a vertical direction.

One object of the invention is achieved by a method for gripping a stack of flat-folded cartons with a gripping device, where the steps of entering the stack of carton blanks with the gripping device such that the gripping jaws of the gripping device are positioned on each side of the stack of cartons, closing the gripping jaws such that the distance between the gripping jaws is less than the height of the stack of cartons, and before or at the same time, displacing one side of the stack of flat-folded cartons in the longitudinal direction of the stack of flat-folded cartons such that the flat-folded cartons are held in an angled state.

BRIEF DESCRIPTION OF FIGURES

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims.

Figure 1:
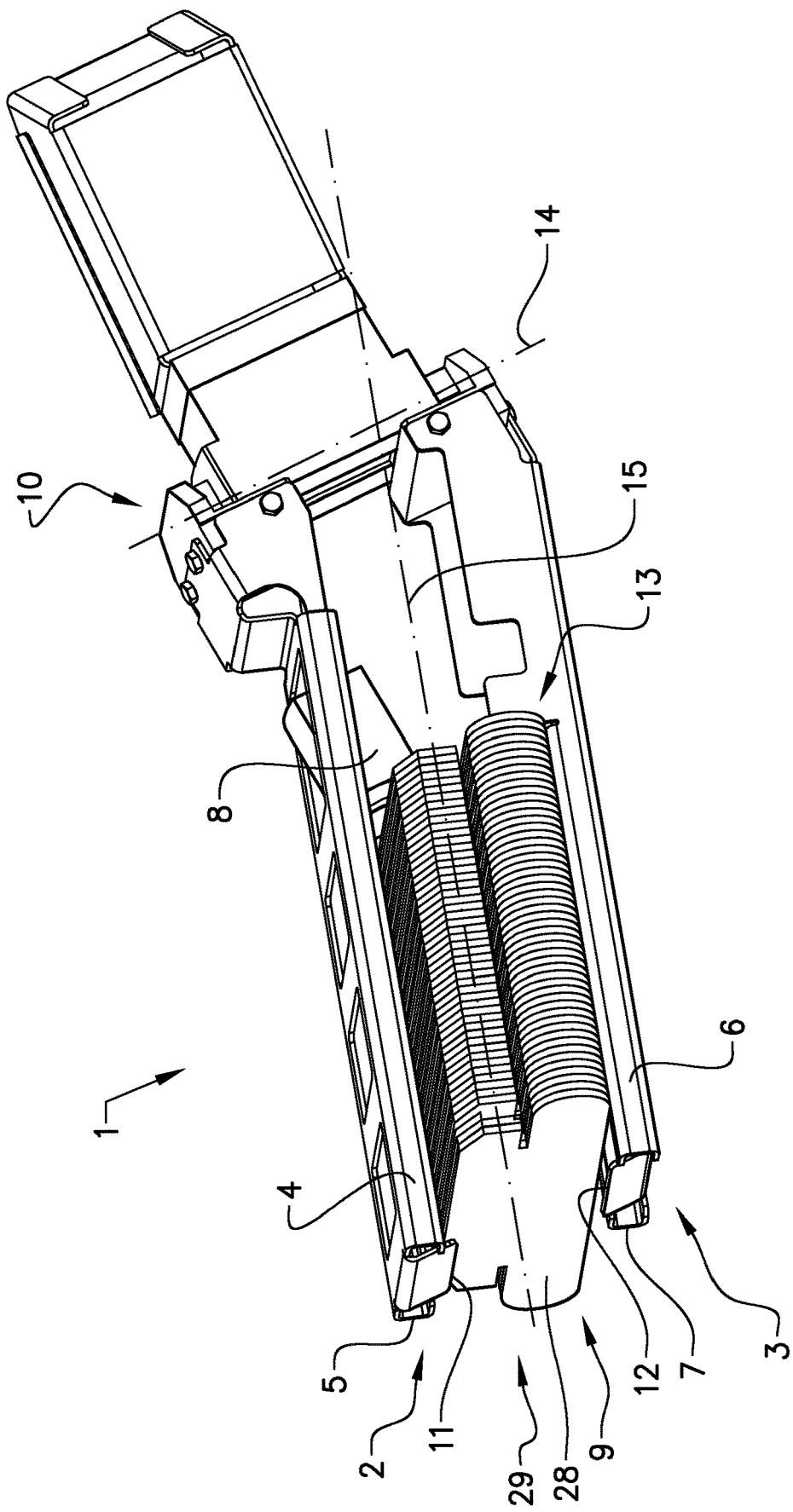
FIG. 1 shows a perspective view of a gripping device according to the invention in an open state.
Figure 2:
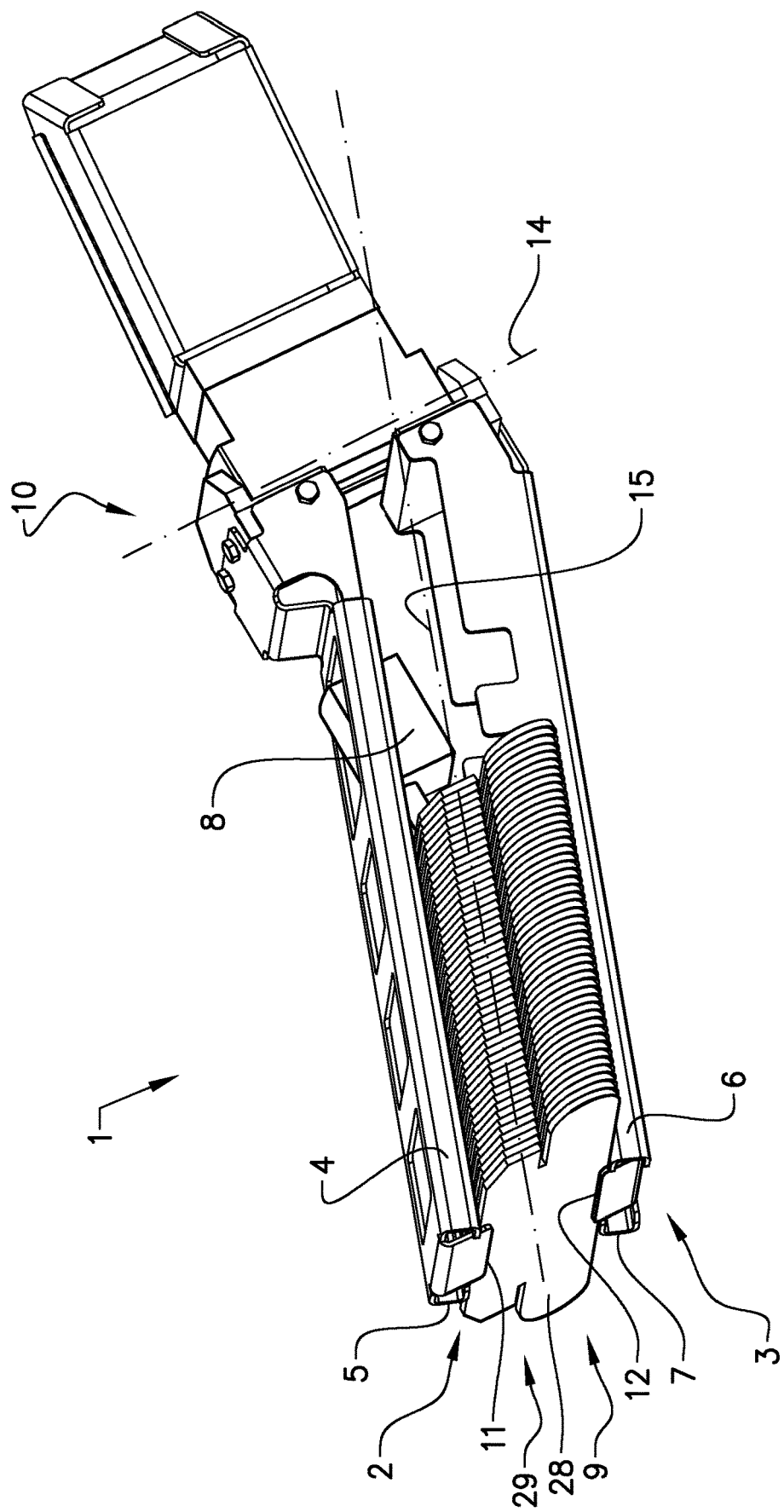
FIG. 2 shows a perspective view of a gripping device according to the invention in a closed state.
Figure 3:
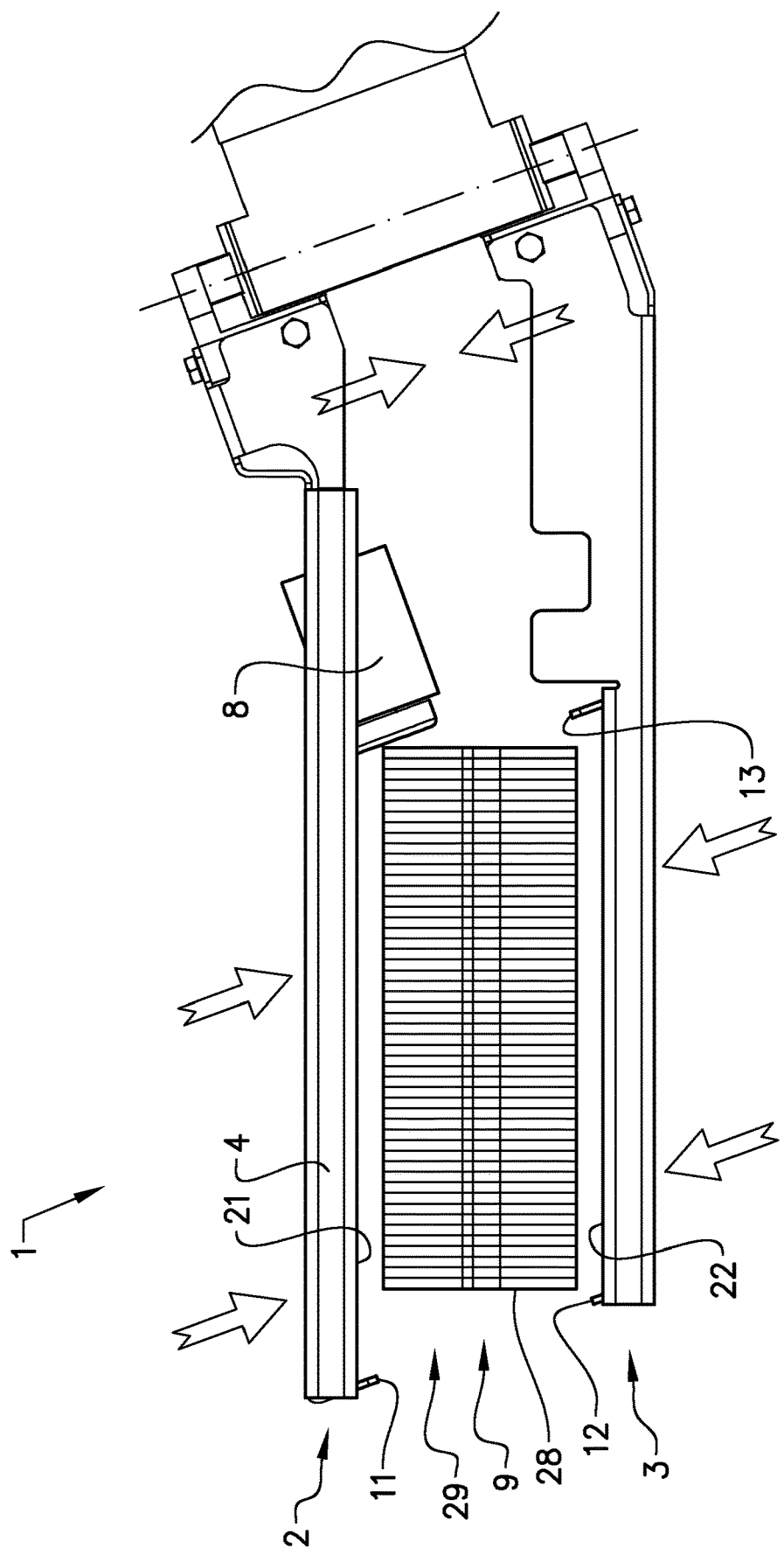
FIG. 3 shows a side view of a gripping device according to the invention in an open state.
Figure 4:
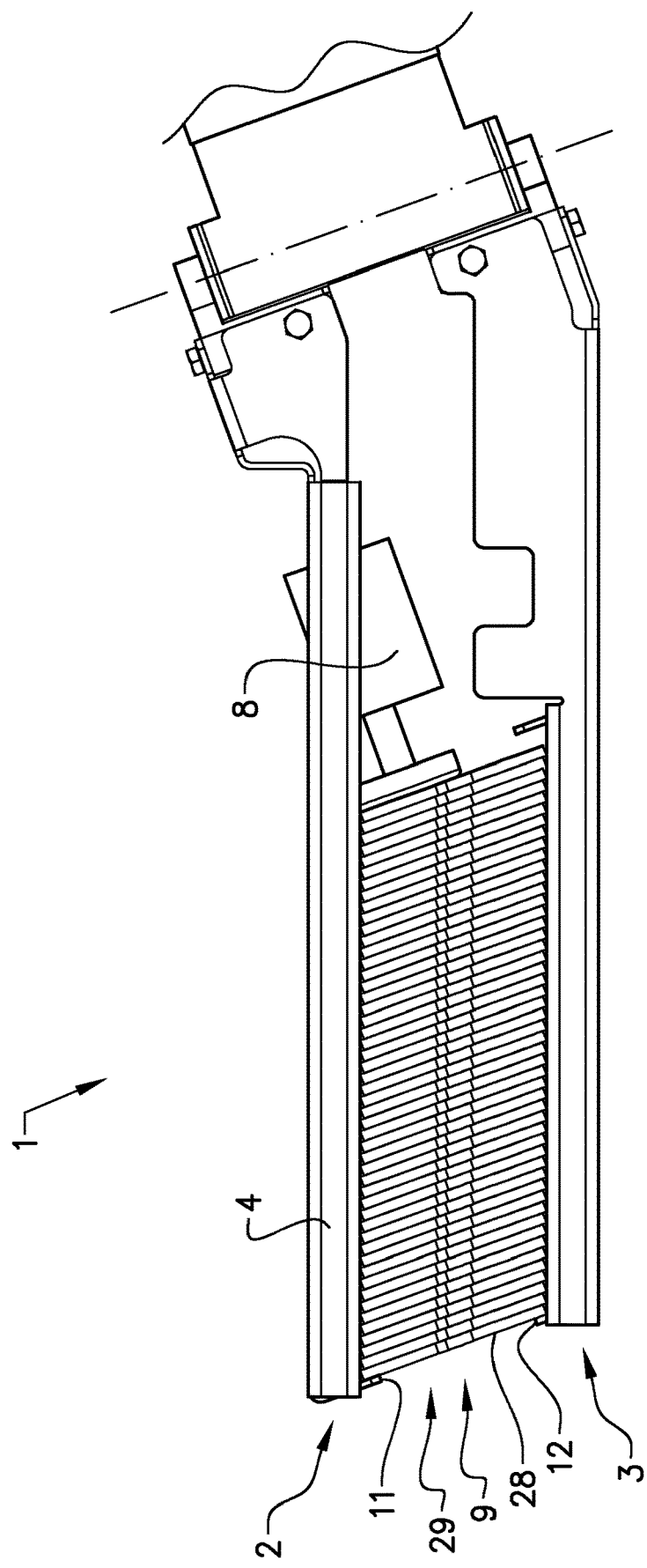
FIG. 4 shows a side view of a gripping device according to the invention in a closed state.

FIG. 1 shows a perspective view of a gripping device according to the invention in an open state and FIG. 2 shows a perspective view of a gripping device according to the invention in a closed state. FIG. 3 shows a side view of a gripping device according to the invention in an open state and FIG. 4 shows a side view of a gripping device according to the invention in a closed state. FIG. 1 to FIG. 4 show a first example of a gripping device.

The gripping device 1 is adapted to grip and hold a stack of flat-folded cartons, such that the stack of flat-folded cartons can be picked up at a feeding station and be moved to a magazine at e.g. a carton erecting device. The gripping device 1 is provided with a first gripping jaw 2 and a second gripping jaw 3, where the first gripping jaw 2 is provided with a first gripping surface 21 and the second gripping jaw 3 is provided with a second gripping surface 22. The first and the second gripping surfaces are parallel to each other and to a centre axis 15 of the gripping device. The first and second gripping jaws are arranged adjacent each other, such that they can grip and hold a stack of flat-folded cartons by the edges of the flat-folded cartons. Between the gripping jaws, there is a holding space 9. The gripping jaws may be designed in different ways, depending on the type and size of flat-folded cartons that the gripping device is intended to grip, and also depending on the feeding station in which the stack of flat-folded cartons is gripped.

In the shown example, each gripping jaw is provided with two gripping fingers. The first gripping jaw 2 is provided with a first gripping finger 4 and a second gripping finger 5, and the second gripping jaw 3 is provided with a first gripping finger 6 and a second gripping finger 7. In order to increase the stability of a gripping jaw, the two gripping fingers are interconnected to each other with a number of webs extending between the gripping fingers at the outer part of the gripping jaw. The two gripping fingers provide two spaced apart bearing surfaces which constitute the gripping surfaces and which provide a secure hold of a stack of flat-folded cartons. The gripping fingers all extend parallel to each other and are parallel to a centre plane arranged through a centre axis 15 of the gripping device. The distance between the two fingers of the first gripping jaw is essentially equal to the distance between the two fingers of the second gripping jaw. It is also possible that a gripping jaw comprises two or more separate gripping fingers, depending on e.g. how the stack of flat-folded cartons is held in a feeding station.

The shape of the first and the second gripping jaws differ from each other in the shown example, but they may also be identical. The gripping device can be used in any orientation. However, in the described example, the first gripping jaw will be referred to as the upper gripping jaw, and the second gripping jaw will be referred to as the lower gripping jaw, corresponding to the position of the gripping device when gripping a stack of flat-folded cartons arranged in a horizontal position. When a stack of flat-folded cartons are arranged in a horizontal position, the lower side and the upper side of the stack will be horizontal. Each flat-folded carton will be vertical. This definition of horizontal and vertical will be used to define the stack even if the stack is held in another orientation. The flat-folded cartons are here perpendicular to the centre axis of the gripping device.

In the shown first example, the gripping fingers are provided with bearing surfaces that are flat and hard, having a low friction. The low friction will allow the cartons to glide against the gripping surface when they are angled. In order to be able to hold the stack of flat-folded cartons in a secure way, each gripping jaw is provided with catches adapted to bear on and hold the stack of flat-folded cartons when the gripping device is in the closed state. The catches delimit the holding space 9 of the gripping device. The upper gripping jaw 2 is provided with a front catch 11 at the front end of the gripping jaw, and the lower gripping jaw 3 is provided with a front catch 12 at the front end of the gripping jaw and a rear catch 13 at the rear end of the gripping jaw. The upper gripping jaw is further provided with a pushing device 8 that is adapted to push and bear on the stack of flat-folded cartons.

When a stack of flat-folded cartons is to be gripped by the gripping device, the gripping device is positioned around the stack of flat-folded cartons such that the stack is positioned in the holding space of the gripping device. The gripping device is now arranged in an open state. The distance between the edges of the front catches is greater than the height of the stack of flat-folded cartons, such that the gripping device can be positioned in a gripping position without touching the stack. The stack is held in a feeding position by holding means of the feeding station (not shown). The height of a flat-folded carton is equal to the height of a stack of flat-folded cartons. The height of a flat-folded carton is defined as the sum of two adjacent sides of the carton arranged beside each other when the carton is flat-folded. The height will equal the width of the upper side of a carton plus the height of a side of the carton.

When the gripping device performs a closing action in order to grip the stack of flat-folded cartons, the gripping jaws will move inwards, towards the centre plane of the gripping device and towards the upper and lower edges of the flat-folded cartons of the stack of flat-folded cartons. At the same time, one side of the stack of flat-folded cartons is displaced in a longitudinal direction, parallel to the centre axis. It is possible to displace the upper side or the lower side of the stack. In the shown example, a pushing device 8 is used to push the upper side of the stack of flat-folded cartons in a forward direction in order to tilt the stack, such that the outermost flat-folded carton in the stack will bear against the upper front catch 11. The stack of flat-folded cartons is now held in an angled state in the gripping device, and is secured by the upper front catch 11, the lower front catch 12, the lower rear catch 13 and the pushing device 8. The pushing device 8 will be in an extended position during the transfer of the stack of flat-folded cartons. The pushing device is in the shown example an air cylinder, but other actuators may also be used. The tilt angle of the flat-folded cartons is preferably in the range of 3 to 15 degrees with respect to a vertical plane of the stack, perpendicular to the centre axis of the gripping device. It is also possible to provide the feeding station with a pushing device which is adapted to push the flat-folded cartons to an angled state before the gripping device is in a gripping position or at the same time as the gripping device performs a closing action.

In FIG. 3, the gripping device is shown in an open state, before a stack of flat-folded cartons is gripped, and FIG. 4 shows the gripping device in a closed state, holding the stack of flat-folded cartons. When the gripping device is positioned around the stack of flat-folded cartons and is to grip the stack of flat-folded cartons, the lower gripping jaw is moved upwards towards the lower side of the stack and the upper gripping jaw is moved downwards towards the upper side of the stack. At the same time, the pusher device extends and pushes the upper side of the stack of flat-folded cartons forwards, towards the front of the gripping jaw, such that the outermost flat-folded carton will bear against the upper front catch. In this way, the flat-folded cartons will be held in an angled manner by the gripping device.

The gripping device further comprises a gripping head 10 to which the gripping jaws are attached. The gripping head comprises movable attachment sections such that a gripping jaw can be moved in at least one direction. In the shown example, the gripping jaws are adapted to move along a moving direction 14, which is inclined with respect to a vertical direction. Depending on the design of the gripping device, and on the method for tilting the stack of flat-folded cartons, the gripping jaws may also move in a direction perpendicular to the centre axis 15. In the shown example, the centre axis 15 of the gripping device is horizontal in the gripping position. However, the gripping device may be used to grip a stack of flat-folded cartons in any direction and orientation, the horizontal direction is used for reference purposes. By orientating the moving direction of the gripping jaws with an angle that is not perpendicular to the horizontal centre plane, the gripping jaws will also perform a slight movement in a longitudinal direction parallel to the horizontal plane, when the griping device is being closed. This movement will help to orient and hold the stack of flat-folded cartons in the gripping device.

Each gripping finger of the gripping device may also be provided with a high friction surface, e.g. in the form of a friction insert. The friction insert is preferably made from a relatively soft material, such as plastic, rubber or cork, and is adapted to provide a reliable gripping surface of the gripping jaws. The friction insert is attached to a gripping finger in a removable way, such that the friction insert can easily be replaced, e.g. when a different gripping surface is required or when the friction insert is worn. The friction insert will further provide a gripping surface that does not damage the flat-folded cartons.

It is also possible to displace one of the gripping jaws in a longitudinal direction, parallel to the centre plane of the gripping device, instead of using a pushing device. In this way, one of the gripping jaws, preferably the upper gripping jaw, will move in a direction to or from the gripping head. Since the flat-folded cartons are held by the high friction gripping surfaces of the gripping jaws, the upper side of the flat-folded cartons can be longitudinally displaced and tilted without falling out of the gripping device. The upper gripping jaw is also moved slightly in the vertical direction at the same time, such that the distance between the gripping jaws is less than the height of the stack of flat-folded cartons, such that the stack of flat-folded cartons is held in an angled and secure way.

The distance between the gripping jaws is greater than the height of the stack of flat-folded cartons when the gripping device is in an open state, such that the gripping device can be positioned around the stack of flat-folded cartons in an easy way. In one example, the lower gripping jaw 3 is adapted to move in one direction, along a vertical axis, towards the horizontal centre plane of the gripping device. The upper gripping jaw 2 is also adapted to move towards the horizontal centre plane. By moving both gripping jaws inwards, towards the centre plane, the stack of cartons can be gripped in a reliable way.

Figure 5:
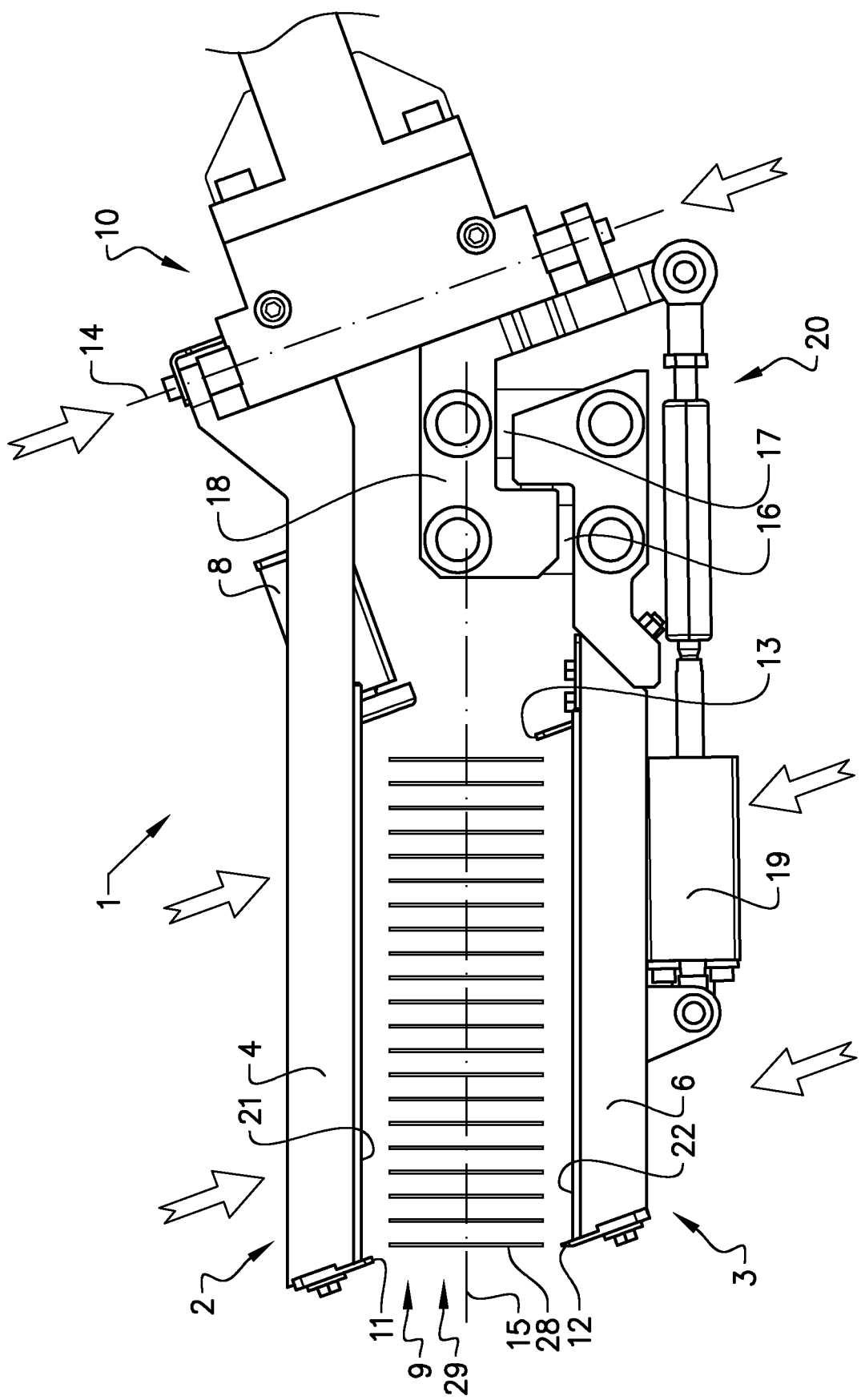
FIG. 5 shows a side view of a second example of a gripping device according to the invention in an open state.
Figure 6:
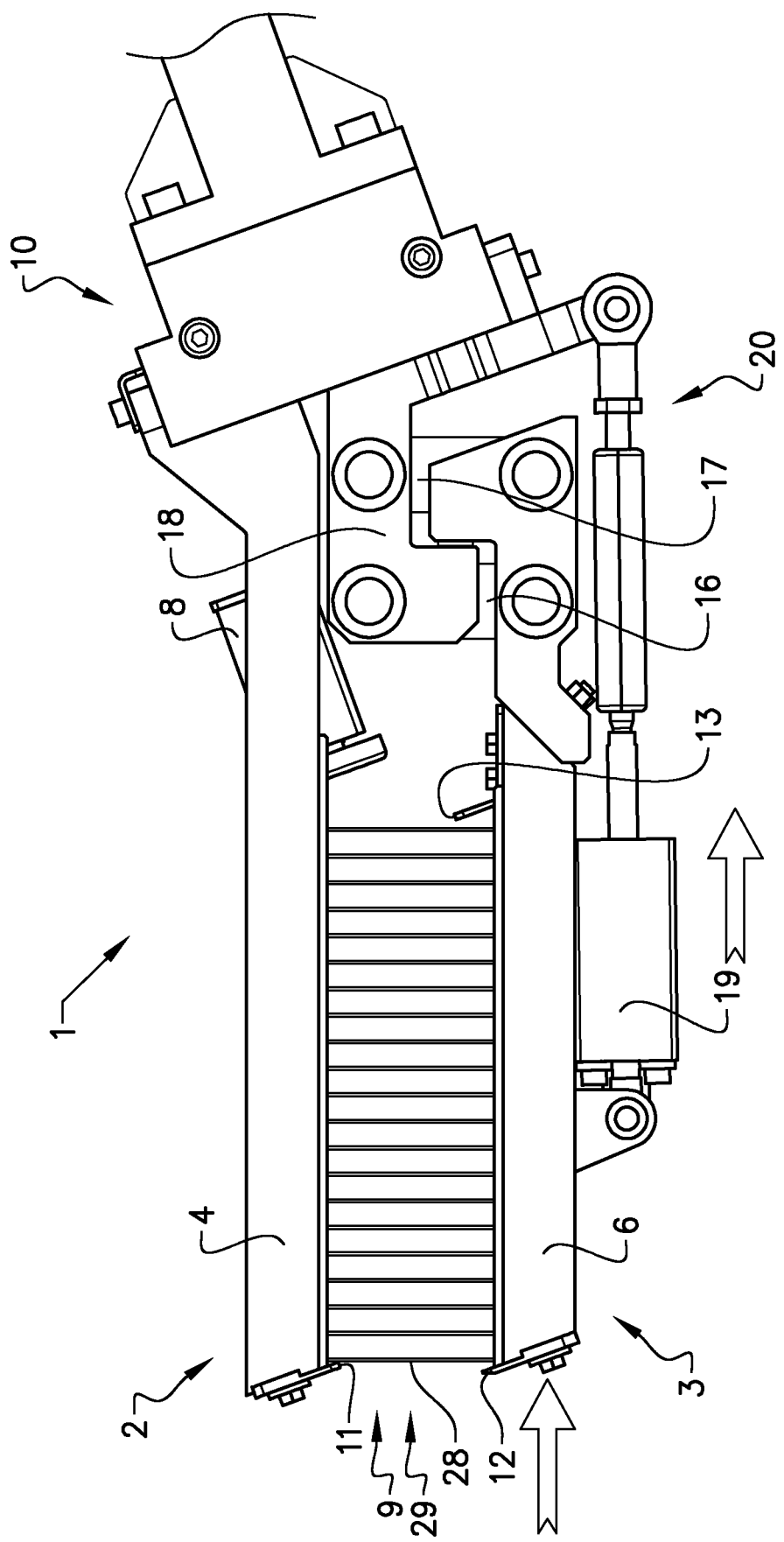
FIG. 6 shows a side view of a second example of a gripping device according to the invention in an intermediate state.
Figure 7:
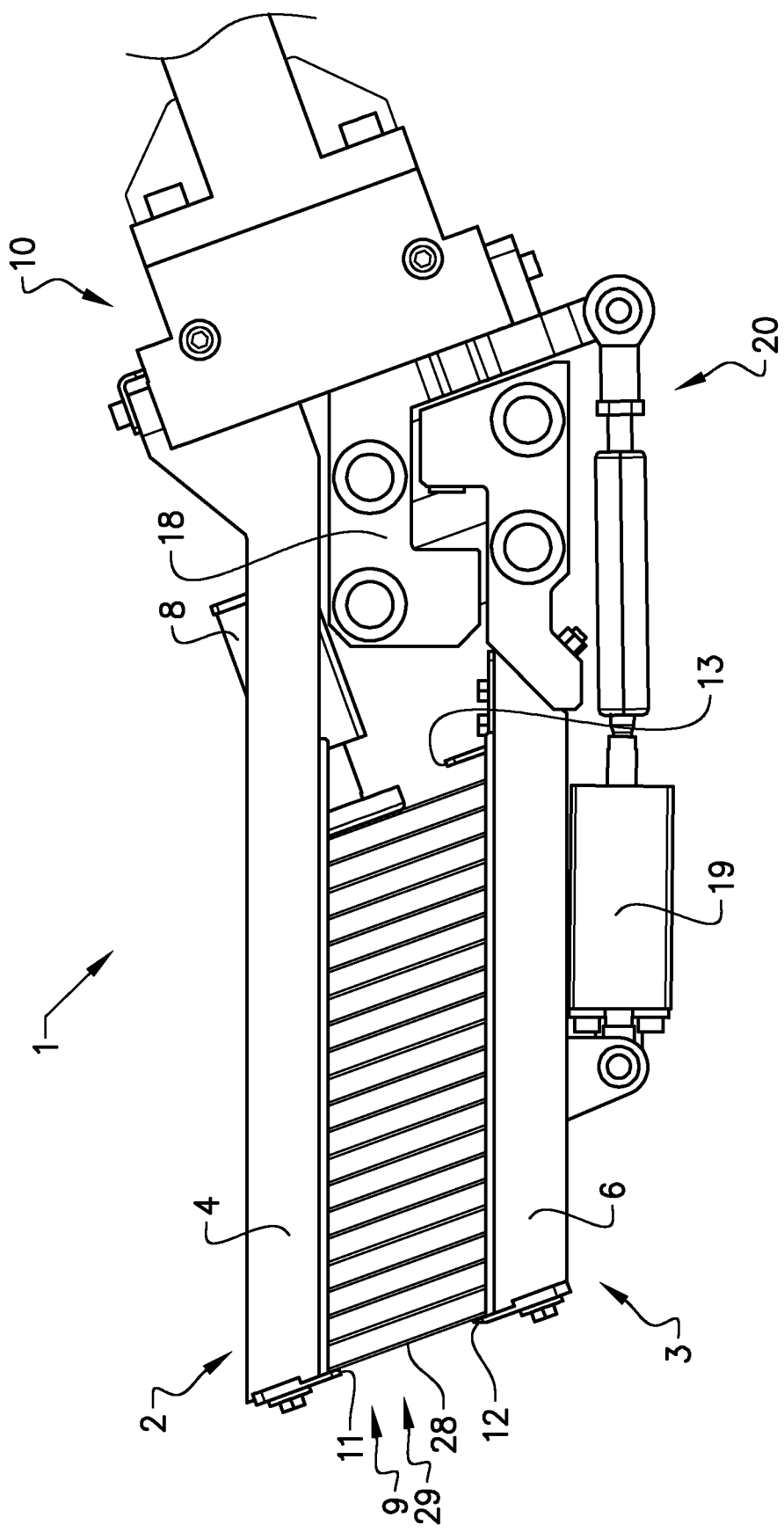
FIG. 7 shows a side view of a second example of a gripping device according to the invention in a closed state.

In another example of a gripping device, as shown in FIG. 5 to FIG. 7, the gripping device is provided with a first arm 16 and a second arm 17 which are arranged in parallel to each other. One end of the arms is attached to a bracket 18 which is attached to the gripping head 10. The other end of the arms is attached to the lower gripping jaw 3. The distance between the attachments of the arms is the same for the bracket and for the gripping jaw. This will create a parallelogram arrangement 20 which allows the lower gripping jaw to perform a movement to the rear of the gripping device and towards the first gripping jaw at the same time. During the movement, the first gripping jaw and the second gripping jaw will be parallel.

In FIG. 5, the gripping device is shown in an open state, before a stack of flat-folded cartons is gripped. FIG. 6 shows the gripping device in an intermediate state, where the first gripping jaw bears on the upper side of the stack and the second gripping jaw bears on the lower side of the stack. This state is reached by moving the first gripping jaw and the second gripping jaw towards each other. In the shown example, the first gripping jaw and the second gripping jaw are moved along the moving direction 14 of the gripping head. In this intermediate state, the flat-folded cartons are still vertical and the stack has not been tilted.

FIG. 7 shows the gripping device in a closed state. This state is reached by holding the first gripping jaw still and by moving the second gripping jaw upwards and rearwards by the use of the parallelogram arrangement. An actuator, in this example an air cylinder 19, retracts and pulls the second gripping jaw rearwards. Due to the parallelogram arrangement 20, the second gripping jaw will at the same time move towards the first gripping jaw. The lower side of the stack will now be displaced rearwards such that the stack is tilted. The pushing device 8 is at the same time extended such that it will support the tilted stack together with the upper front catch 11, the lower front catch 12 and the lower rear catch 13.

Figure 8:
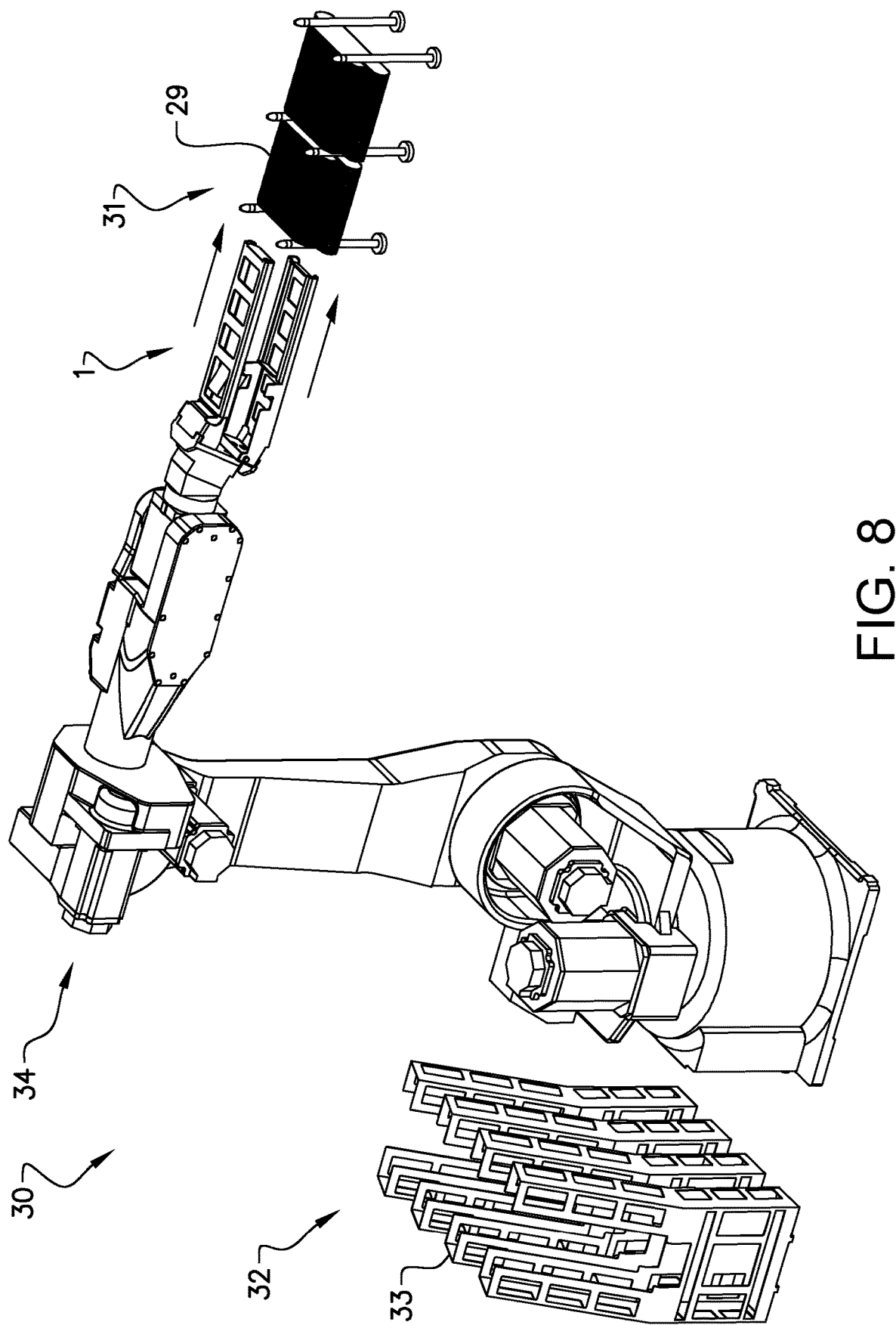
FIG. 8 shows a loading station comprising a gripping device according to the invention.

FIG. 8 shows a loading station 30 comprising a loading device 34 having a gripping device 1 according to the invention. The loading device is preferably an articulated industrial robot to which the gripping device is attached. The gripping device picks up a stack 29 of flat-folded cartons 28 at a feeding position 31. The stack of flat-folded cartons is in the shown example held in a horizontal direction, but may be held in any position depending on the way the stack of flat-folded cartons is supplied. The stack of flat-folded cartons is gripped by the gripping device as described above, such that the stack of flat-folded cartons is held in an angled manner by the gripping device. The gripping device will then move the stack of flat-folded cartons to a loading position 32 positioned at a carton erecting device. In the loading position, the stack of flat-folded cartons is inserted into a magazine 33 used to feed flat-folded cartons to the carton erecting device. The inner dimensions of the magazine are essentially equal to the dimensions of a flat-folded carton, such that the play between the flat-folded cartons and the magazine is minimized. This will improve the feeding of flat-folded cartons to the pick-up head of the carton erecting device, since the flat-folded cartons will be stored and held in a more secure way in the magazine.

The height of the magazine is relatively low and corresponds preferably to a number of stacks of flat-folded cartons, such that e.g. a maximum of 3 to 4 stacks of flat-folded cartons can be held in the magazine at the same time. In this way, enough flat-folded cartons can be held by the magazine to secure a reliable feed of flat-folded cartons to the carton erecting device since a buffer is created, and the amount of stored flat-folded cartons will ensure that the cartons will lay flat on each other. With too many flat-folded cartons stored on each other, there is a risk that the flat-folded cartons will rise on one side and not lay flat on each other. This may cause a malfunction in the feed of flat-folded cartons to the carton erecting device.

The magazine is preferably inclined from a vertical direction, preferably by an angle of between 10 to 20 degrees. The gripping device arrives at the loading position and inserts the stack of flat-folded cartons in the magazine. Since the stack of flat-folded cartons is held in an angle by the gripping device, and since the magazine is inclined, the feeding of flat-folded cartons to the magazine is simplified. Preferably, the angle with which the stack of flat-folded cartons is held by the gripping device corresponds to the inclination angle of the magazine. When the stack of flat-folded cartons is released in the magazine by opening the gripping jaws, the flat-folded cartons will be positioned more or less in the position in which they are to be stored in the magazine. The possibility of misaligned flat-folded cartons is thus minimized. At the same time, since the height of the gripped stack of flat-folded cartons is reduced during the transfer of the stack from the feeding position to the loading position, the risk of damaging the flat-folded cartons during insertion into the magazine is also minimized, even though the play in the magazine is reduced.

The loading station preferably comprises a plurality of magazines arranged side by side, such that one loading device can load several magazines. It is e.g. possible to mount 4 or 8 carton erecting devices side by side in order to increase the capacity of the carton erecting station.

The loading station 30 is also capable of picking up a stack 29 of flat-folded cartons 28 if they are oriented in a vertical direction. Preferably, the stack of flat-folded cartons is in such a case held by a holder until the gripping device 1 has gripped the stack of flat-folded cartons in a secure way. The distance between the gripping fingers of a gripping jaw is preferably such that the stack is gripped without the gripping fingers coming into contact with the holder, e.g. by gripping on both sides of the holder.

The invention is not to be regarded as being limited to the embodiments described above, a number of additional variants and modifications being possible within the scope of the subsequent patent claims.

REFERENCE SIGNS

1: Gripping device
2: First gripping jaw
3: Second gripping jaw
4: Gripping finger
5: Gripping finger
6: Gripping finger
7: Gripping finger
8: Pushing device
9: Holding space
10: Gripping head
11: Upper front catch
12: Lower front catch
13: Lower rear catch
14: Moving direction
15: Centre axis
16: First arm
17: Second arm
18: Bracket
19: Cylinder
20: Parallelogram arrangement
21: First gripping surface
22: Second gripping surface
28: Flat-folded carton
29: Stack of flat-folded cartons
30: Loading station
31: Feeding position
32: Loading position
33: Magazine
34: Loading device

The invention claimed is:

1. Gripping device (1) adapted for gripping a stack (29) of flat-folded cartons (28), wherein the gripping device (1) comprises a first gripping jaw (2) and a second gripping jaw (3) arranged adjacent each other and enclosing a holding space (9), where a centre axis (15) of the gripping device (1) is parallel with a gripping surface (21, 22) of a gripping jaw (2, 3), where the gripping device (1) is provided with a first open state in which the distance between the gripping jaws (2, 3) is greater than the height of the stack (29) of flat-folded cartons (28), wherein the gripping device (1) is adapted to displace an upper or lower side of the stack (29) of flat-folded cartons (28) in a longitudinal direction parallel to a centre axis (15) of the gripping device (1), and that the gripping device (1) is provided with a second closed state in which the distance between the gripping jaws (2, 3) is less than the height of the stack (29) of flat-folded cartons (28), such that each flat-folded carton (28) of the stack of flat-folded cartons (29) will be held in an angled state by the gripping device (1).

2. Device according to claim 1, wherein the gripping device is provided with a pushing device (8) adapted to extend in a direction towards the front of the gripping device, thereby pushing one side of the stack (29) of flat-folded cartons towards the front of the gripping device, such that the stack (29) of flat-folded cartons will arrive at the angled state.

3. Device according to claim 1, wherein the gripping device is provided with a plurality of catches (11, 12, 13) arranged at the front end and the rear end of the holding space (9), where the catches (11, 12, 13) are adapted to bear on and hold the stack (29) of flat-folded cartons in the angled state.

4. Device according to claim 1, wherein one gripping jaw (2; 3) is adapted to perform a movement in a longitudinal direction along the centre axis (15) with regards to the other gripping jaw (2; 3) during the closing of the gripping device, such that the stack (29) of flat-folded cartons will arrive at the angled state.

5. Device according to claim 4, wherein the gripping device comprises a parallelogram arrangement (20) which allows for a displacement of a gripping jaw (2, 3) both along the centre axis (15) and perpendicular to the centre axis (15).

6. Device according to claim 1, wherein each gripping jaw (2, 3) is provided with a friction material.

7. Device according to claim 1, wherein the distance between the gripping jaws (2, 3) in the second closed state is between 2-15% less than the height of the stack (29) of flat-folded cartons (16).

8. Device according to claim 1, wherein the flat-folded cartons (16) of a stack (29) are angled with an angle between 3 and 15 degrees in the closed state relative a direction perpendicular to the centre axis (15).

9. Loading station (20), comprising a gripping device (1) according to claim 1.

10. Loading station according to claim 9, wherein the loading station (30) is adapted to grip a stack (29) of flat-folded cartons (28) at a feeding position (31), and to move the stack (29) of flat-folded cartons (28) to a loading position (32) in which the stack (29) of flat flat-folded cartons (28) is inserted into a magazine (33), where the magazine (33) is inclined from a vertical direction.

11. Loading station according to claim 10, wherein the inclination of the magazine is between 10 to 20 degrees.

12. Loading station according to claim 10, wherein the loading station (30) comprises a plurality of magazines (33).

* * * * *